(12) United States Patent
Li et al.

(10) Patent No.: US 11,169,912 B2
(45) Date of Patent: Nov. 9, 2021

(54) ENTITY AND RELATIONSHIP JOINT EXTRACTION METHOD ORIENTED TO SOFTWARE BUG KNOWLEDGE

(71) Applicant: Yangzhou University, Jiangsu (CN)

(72) Inventors: Bin Li, Jiangsu (CN); Dingshan Chen, Jiangsu (CN); Cheng Zhou, Jiangsu (CN); Xiaobing Sun, Jiangsu (CN)

(73) Assignee: Yangzhou University, Jiangsu (CN)

( * ) Notice: Subject to any disclaimer, the term of this patent is extended or adjusted under 35 U.S.C. 154(b) by 0 days.

(21) Appl. No.: 17/054,301

(22) PCT Filed: Aug. 28, 2019

(86) PCT No.: PCT/CN2019/102930
§ 371 (c)(1),
(2) Date: Nov. 10, 2020

(87) PCT Pub. No.: WO2020/093761
PCT Pub. Date: May 14, 2020

(65) Prior Publication Data
US 2021/0240603 A1    Aug. 5, 2021

(30) Foreign Application Priority Data
Nov. 5, 2018   (CN) .......................... 201811306356.2

(51) Int. Cl.
*G06F 11/36* (2006.01)
*G06F 16/28* (2019.01)
(Continued)

(52) U.S. Cl.
CPC ...... *G06F 11/3692* (2013.01); *G06F 11/3664* (2013.01); *G06F 16/288* (2019.01); *G06F 16/9024* (2019.01); *G06N 7/005* (2013.01)

(58) Field of Classification Search
CPC ............. G06F 11/3664; G06F 11/3692; G06F 16/288; G06F 16/9024; G06N 7/005
See application file for complete search history.

(56) References Cited

U.S. PATENT DOCUMENTS

2012/0102315 A1    4/2012   Holtmanns
2017/0032249 A1*   2/2017   Chougule ................ G06N 5/02
(Continued)

FOREIGN PATENT DOCUMENTS

CN   102622510 A   8/2012
CN   104699614 A   6/2015
(Continued)

OTHER PUBLICATIONS

Naresh Kumar Nagwani et al., "Weight Similarity Measurement Model Based, Object Oriented Approach for Bug Databases Mining to Detect Similar and Duplicate Bugs", [Online], pp. 202-207, [Retrieved from Internet on Jul. 1, 2021], <https://dl.acm.org/doi/pdf/10.1145/1523103.1523145>, (Year: 2009).*

(Continued)

*Primary Examiner* — Ziaul A Chowdhury
(74) *Attorney, Agent, or Firm* — Simpson & Simpson, PLLC; Michael Nicholas Vranjes

(57) ABSTRACT

Provided is an entity and relationship joint extraction method oriented to software bug knowledge. The method includes collecting text data of an open-source bug library and preprocessing the text data to obtain a bug text data corpus; extracting, from the bug text data corpus, a statement S for describing a bug, and then processing S, and using the processed S as a subsequent input statement; constructing an entity and relationship joint extraction model; obtaining, in conjunction with the constructed entity and relationship joint extraction model based on a transition system, an entity set E and a relationship set R corresponding to the input statement; and outputting the entity set E and (Continued)

the relationship set R to complete joint extraction of entities and relationships.

10 Claims, 3 Drawing Sheets

(51) Int. Cl.
*G06N 7/00* (2006.01)
*G06F 16/901* (2019.01)

(56) References Cited

U.S. PATENT DOCUMENTS

| | | | |
|---|---|---|---|
| 2018/0095004 A1* | 4/2018 | Ide | G06N 7/005 |
| 2018/0173495 A1* | 6/2018 | Podder | G06N 3/04 |
| 2020/0073882 A1* | 3/2020 | Guggilla | G06F 16/353 |
| 2020/0073933 A1* | 3/2020 | Zhao | G06F 40/295 |

FOREIGN PATENT DOCUMENTS

| | | |
|---|---|---|
| CN | 106951365 A | 7/2017 |
| CN | 107273295 A | 10/2017 |
| CN | 107832781 A | 3/2018 |
| CN | 109492113 A | 3/2019 |

OTHER PUBLICATIONS

Abdelmonim Naway et al., "Using Deep Neural Network for Android Malware Detection", [Online], pp. 1-9, [Retrieved from Interent on Jul. 1, 2021], <https://arxiv.org/ftp/arxiv/papers/1904/1904.00736.pdf>, (Year: 2019).*

Alexander Breckel, "Error Mining: Bug Detection through Comparison with Large Code Databases", [Online], pp. 175-178, [Retrieved from Interent on Jul. 1, 2021], <https://ieeexplore.IEEE.org/stamp/stamp.jsp?tp=&arnumber=6224278> (Year: 2012).*

Yu Zhou et al., "Combining Text Mining and Data Mining for Bug Report Classification", [Online], pp. 311-320, [Retrieved from Interent on Jul. 1, 2021], <https://ieeexplore.IEEE.org/stamp/stamp.jsp?tp=&arnumber=6976097> (Year: 2014).*

* cited by examiner

ENTITY AND RELATIONSHIP JOINT EXTRACTION METHOD ORIENTED TO SOFTWARE BUG KNOWLEDGE

CROSS-REFERENCE TO RELATED APPLICATIONS

This application is a national stage application filed under 35 U.S.C. § 371 based on International Patent Application No. PCT/CN2019/102930, filed on Aug. 28, 2019, which application claims priority to Chinese Patent Application No. 201811306356.2, filed with the CNIPA on Nov. 5, 2018, disclosures of which are incorporated herein by reference in their entireties.

FIELD

The present disclosure relates to the field of software maintenance and, in particular, to an entity and relationship joint extraction method oriented to software bug knowledge.

BACKGROUND

Bug fixing is an important part of a software maintenance process. With the advent of the big-data era, text data on the Internet increases dramatically. Similarly, the scale of a software project also expands and the complexity of a software project is greatly improved. A large number of bugs occur in the software development process. How to accurately and efficiently address and solve these bugs has become the main task at present. On the one hand, these massive texts contain a wealth of knowledge; and on the other hand, a large amount of redundant information is contained in these massive texts. Therefore, we need to think about how to efficiently and accurately extract entities and relationships between the entities from the unstructured text data so that structured knowledge is formed to help people to quickly obtain key information.

For a large number of bug reports on the Internet, entity and relationship joint extraction is performed so that the key information of a bug is extracted to help a software developer to quickly and efficiently understand bug information and complete repair. At present, two main methods are widely used in an entity and relationship extraction task. One method is series extraction in which entities and relationships are extracted in series, and the other method is joint extraction of entities and relationships. The series method divides this task into two different subtasks, that is, named entity recognition and relationship recognition. Traditional named entity recognition models are linear statistical models, such as a Hidden Markov model (HMM) and a conditional random field (CRF) model. Recently, some neural network structures have also been successfully applied to named entity recognition. The named entity recognition is regarded as a sequence tagging task. The existing relationship recognition methods may also be divided into a method based on manual construction of characteristics and a neural network method. This separate processing method is relatively simple, and each module is relatively flexible. However, this method ignores the connection between the two tasks, and the result of entity recognition may affect extraction of relationships. Different from the traditional series method, during joint extraction, a model is used to extract entities and relationships. The term "joint learning" is not a recent term. In the field of natural language processing, researchers have long used a joint model based on traditional machine learning to perform joint learning on some closely related natural language processing tasks, such as joint learning of entity recognition and entity standardization, joint learning of word segmentation and part-of-speech tagging. This method is applied to entity recognition and relationship extraction so that entity and relationship information is effectively integrated and a good effect is achieved. A single model is used in joint extraction of entities and relationships. Most joint methods are implemented based on characteristics. A large number of models based on LSTM which have been used recently can reduce manual effort. However, this method is implemented based on characteristics and depends heavily on other natural language processing tools that may introduce errors. Therefore, to reduce the work of manual characteristic extraction, an end-to-end model based on a neural network is proposed so that entities and relationships are jointly extracted. The end-to-end model maps an input statement into a meaningful vector and then generates a sequence. The end-to-end model is widely used in machine translation and the sequence tagging task. In most methods, bidirectional LSTM is used in coding of an input statement, but the decoding methods are always different. For example, a CRF layer is used in decoding of a tag sequence, while an LSTM layer is used in generation of the tag sequence. Although these models can share the parameters of entity extraction and relationship extraction in the same model, entity extraction and relationship extraction are performed separately and redundant information is easily generated.

SUMMARY

The technical problem to be solved by the present disclosure is how to provide, in conjunction with the relevant characteristics of data in the software bug field, an entity and relationship joint extraction method oriented to software bug knowledge.

The solution to achieve the object of the present disclosure is an entity and relationship joint extraction method oriented to software bug knowledge. The method includes the steps described below.

In step 1, text data of an open-source bug library is collected and the text data is preprocessed so that a bug text data corpus is obtained.

In step 2, a statement S for describing a bug is extracted from the bug text data corpus obtained in step 1, and S is processed and then the processed S is used as an input statement of step 4.

In step 3, an entity and relationship joint extraction model based on a transition system is constructed.

In step 4, an entity set E and a relationship set R corresponding to the input statement of step 2 are obtained in conjunction with the constructed entity and relationship joint extraction model based on the transition system of step 3.

In step 5, the entity set E and the relationship set R obtained in step 4 are output so that joint extraction of entities and relationships is completed.

Compared with the existing art, the present disclosure has significant advantages as follows. (1) Through the joint extraction method provided in the present disclosure, it is achievable not only to discover potential entities, connections between entities and relationships, and connections between relationships and relationships in bug statements, but also to avoid error propagation in series extraction of bug relationship triple. (2) In the present disclosure, by using a set of transition rules is formed by an arc-eager algorithm, after a series of transition actions, an entity recognition and relationship extraction joint task is represented by a directed graph that is directly generated by using a transition-based method so that the continuity and consistency of the task are ensured. (3) In the present disclosure, the design of the directed graph can make the relationship between entities no longer a one-to-one relationship so that complex bug text data can be dealt with. (4) In the present disclosure, the decoding process of a statement is modeled as a construction process of a transition sequence through the transition-based method; and through learning, the next step of transition actions can be accurately predicted, effective action sequences can be generated, effective entity arcs and relationship arcs can be recognized, and the directed graph of input bug statements can be constructed.

The present disclosure will be described below in further detail in conjunction with the drawings.

DETAILED DESCRIPTION

Figure 1:
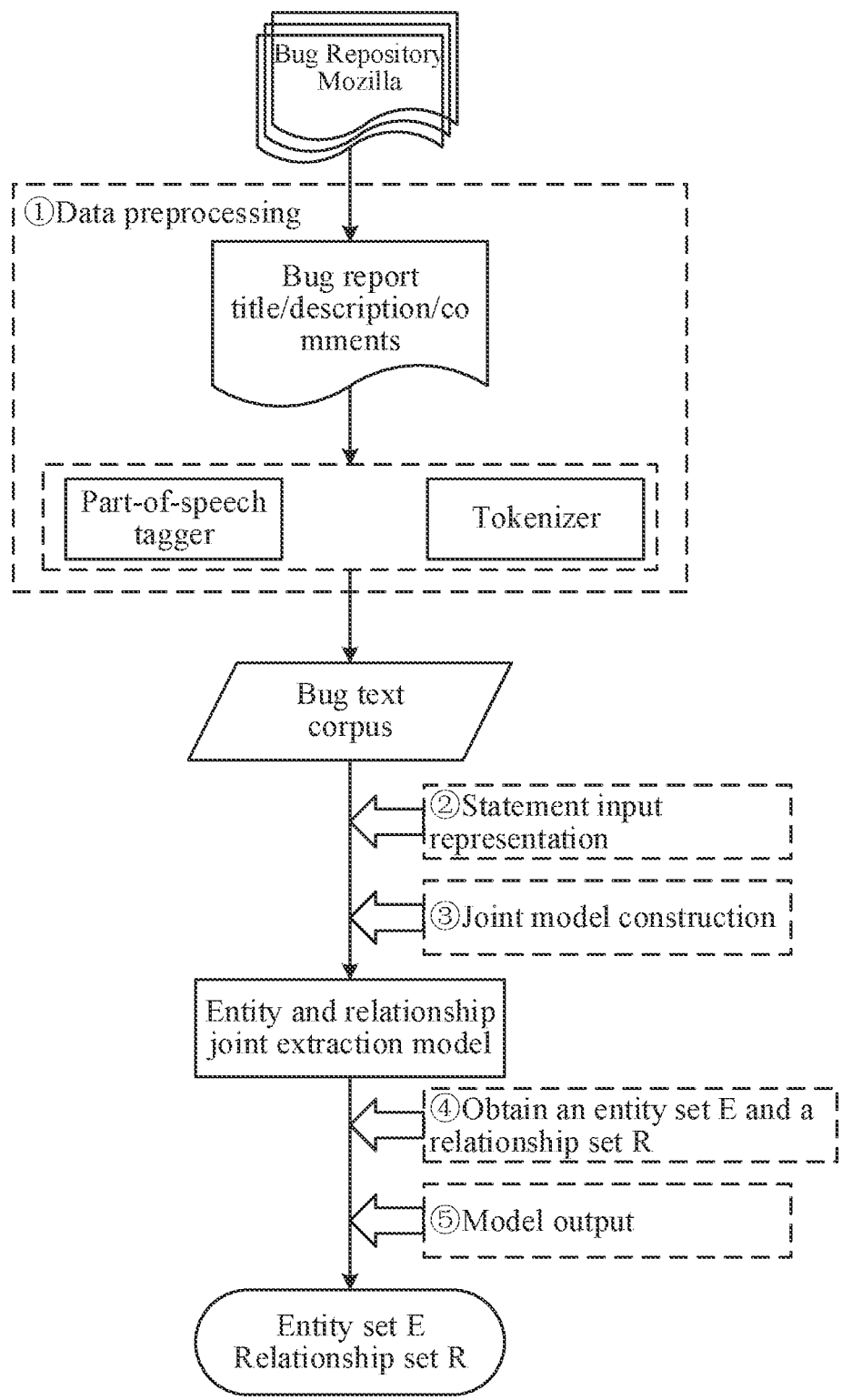
FIG. 1 is a flowchart of an entity and relationship joint extraction method oriented to software bug knowledge according to the present disclosure.

Referring to FIG. 1, in the present disclosure, an entity and relationship joint extraction method oriented to software bug knowledge includes the steps described below.

In step 1, text data of an open-source bug library is collected and the text data is preprocessed so that a bug text data corpus is obtained.

The text data includes a title, a description and a comment in a bug report and a question and an answer in a question and answer website.

The step of preprocessing the text data to obtain the bug text data corpus includes the step described below.

The text data is preprocessed by using a natural language processing tool, and the preprocessed related text data is stored in a form of text so that the bug text data corpus is obtained. The preprocessing includes text extraction, word segmentation, part-of-speech tagging and lemmatization.

In step 2, a statement S for describing a bug is extracted from the bug text data corpus obtained in step 1, S is processed and then the processed S is used as an input statement of step 4. The statement S for describing the bug is described below.

$$S=\{w_1,w_2,w_3,\ldots,w_n\}$$

$w_i$ denotes the i-th word in a statement sequence S, and i=1, 2, ..., n.

The step of processing S includes the steps described below.

In step 2-1, word embedding processing is performed on S. A certain word $w_i$ is represented by a two-dimensional vector: $w_i$ and $\tilde{w}_i$. Each word may be represented as $x_i=\max\{0, V\cdot[w, \tilde{w}]+b\}$.

In step 2-2, Bi-LSTM coding processing is performed on S processed in step 2-1. Bi-LSTM is used for processing a sequence in two directions by using two separate LSTM layers: forward LSTM and backward LSTM, and X=($x_1$, $x_2$, $x_3$, ..., $x_n$) is used as the input. Forward LSTM codes a sequence of words in series, that is, $x_1 \rightarrow x_n$, which is denoted as $\overrightarrow{h}$. Backward LSTM codes a sequence in a reverse direction, that is, $x_1 \rightarrow x_1$, which is denoted as $\overleftarrow{h}$. $h_i=[\overrightarrow{h_i}, \overleftarrow{h_i}]$ is used for representing coding information of $w_i$. Finally, S is processed and the output is represented by the formula $H_s=\{h_1, h_2, h_3, \ldots, h_n\}$. In the formula, $h_i=[\overrightarrow{h_i}, \overleftarrow{h_i}]$ and i=1, 2, ..., n.

In step 3, an entity and relationship joint extraction model based on a transition system is constructed. The step of constructing the entity and relationship joint extraction model based on the transition system includes the steps described below.

In step 3-1, an initial transition state $T_0$ of the entity and relationship joint extraction model based on the transition system is determined.

In step 3-2, an optimal transition action corresponding to the initial transition state $T_0$ of step 3-1 is determined and the optimal transition action is performed on the initial transition state $T_0$ so that a transition state at a next moment is obtained.

In step 3-3, an optimal transition action corresponding to the transition state at the next moment is determined, the optimal transition action is performed on the transition state at the next moment, and such loop is performed until a final transition state $T_n$ is reached, so as to complete the construction of the entity and relationship joint extraction model based on the transition system.

The transition state is represented by an LSTM-based method by using the formula described below.

$$T=(\sigma,\delta,e,\beta,R,E)$$

In the formula, σ denotes a stack storing a generated entity, δ denotes a transition stack storing an entity temporarily popping out of σ and then repressed into σ, e denotes a stack storing part of entity blocks being processed, β denotes a buffer storing unprocessed words, R denotes a relationship set, and E denotes an entity set.

The initial transition state $T_0$ is a transition state in which β is not empty and σ, δ, e, R and E are empty, where $T_0$ is represented by the formula described below.

$$T_0=([\ ],[\ ],[\ ],[w_1,w_2,w_3,\ldots,w_m],\emptyset,\emptyset)$$

In the formula, m denotes the number of the unprocessed words.

The final transition state $T_n$ is a transition state in which β and e are empty, where $T_n$ is represented by the formula described below.

$$T_n=(\sigma,\delta,[\ ],[\ ],R,E)$$

The transition action specifically includes generating a directed graph by using a transition strategy formed by an arc-eager algorithm. According to characteristics of the directed graph, the transition strategy includes two types of transition actions: an entity generation action and a relationship generation action. (1) The entity generation action is used for generating an entity arc. (2) The relationship generation action is used for generating a relationship arc.

In the present disclosure, according to entities and relationships, 10 types of transition actions are designed. The 10 types of transition actions include 7 types of relationship arcs and 3 types of entities. The specific description is made in Table 1.

TABLE 1

Specific description of transition actions

| Recognition Type | Transition Action | State Transition |
|---|---|---|
| Entity recognition | O-Delete | Popping word $w_j$ out of stack β |
| | Gen-Shift | Transferring word $w_j$ from stack β to stack e |
| | Gen-Ner(y) | Popping out the "entity block" at top of stack e, performing tagging, pressing the representation of this block into stack β, and adding this entity to set E |
| Relationship recognition | Left$_r$-Reduce | Generating a relationship arc from $e_j$ to $e_i$ ($e_i \xleftarrow{r} e_j$) ($e_j$ denotes a core node and $e_i$ denotes a modification node) and popping $e_i$ out of stack σ |
| | Right$_r$-Shift | Generating a relationship arc from $e_i$ to $e_j$ ($e_i \xrightarrow{r} e_j$) and storing all entities and $e_j$ in stack δ into stack σ |
| | No-Shift | Storing all entities and $e_j$ in stack δ into stack σ |
| | No-Reduce | Popping $e_i$ out of stack σ |
| | Left$_r$-Pass | Generating a relationship arc from $e_j$ to $e_i$ ($e_i \xleftarrow{r} e_j$) and placing $e_i$ at the top of stack δ |
| | Right$_r$-Pass | Generating a relationship arc from $e_i$ to $e_j$ ($e_i \xrightarrow{r} e_j$) and placing $e_i$ at the top of stack δ |
| | No-Pass | Placing $e_i$ at the top of stack δ |

The step of determining the optimal transition action corresponding to the transition state is described below.

Figure 2:
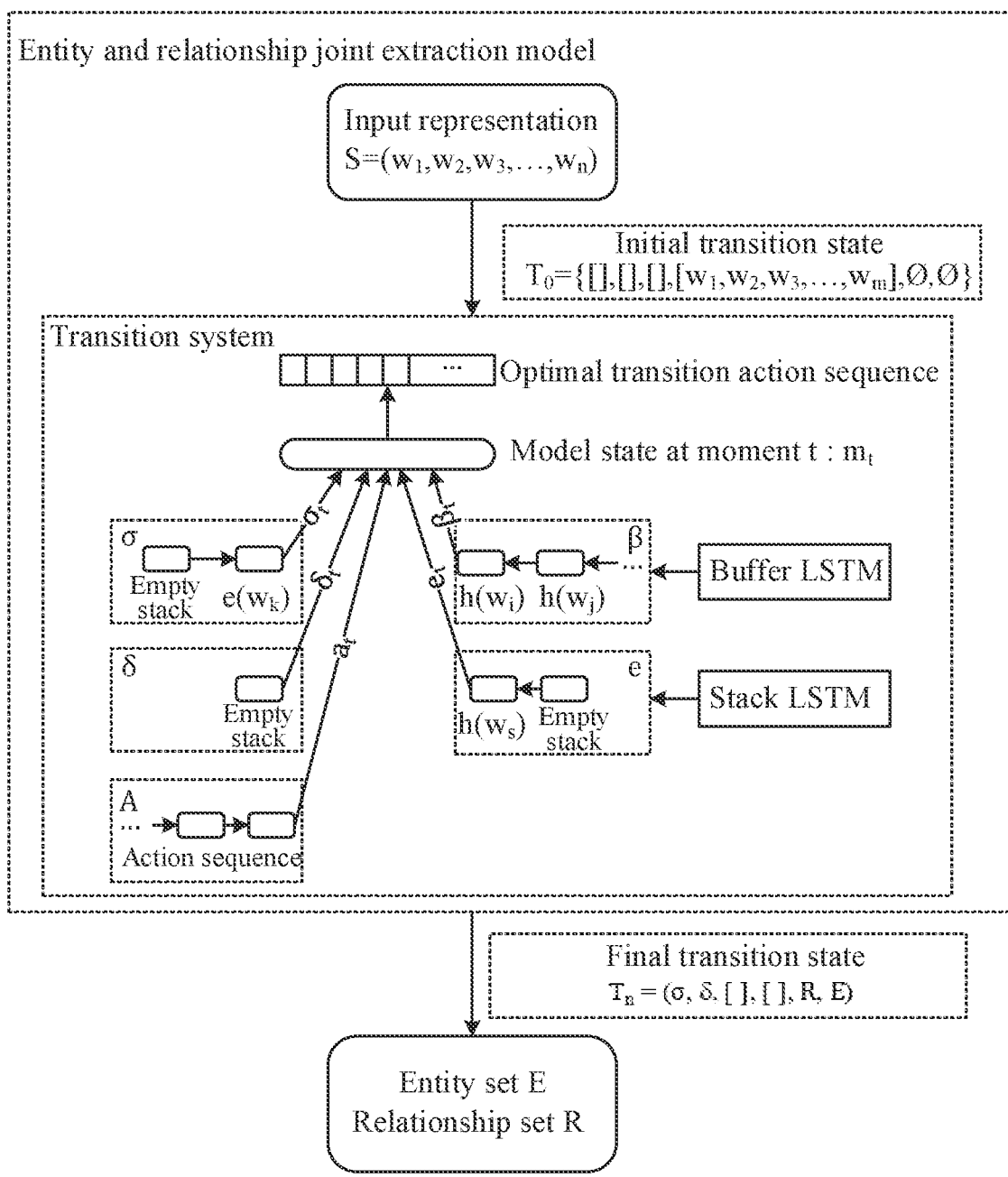
FIG. 2 is a diagram of an entity and relationship joint extraction model according to the present disclosure.

The optimal transition action corresponding to the transition state is determined in conjunction with a softmax function and an arc-standard algorithm based on greedy search. In conjunction with FIG. 2, the step of determining the optimal transition action corresponding to the transition state is performed in the manner described below.

(1) It is assumed that a transition state of the entity and relationship joint extraction model based on the transition system at moment t is described below.

$$m_t = \max\{0, Z\}$$

In the formula, $Z = W[\sigma_t; \delta_t; a_t; \beta_t; e_t] + d$, W denotes a parameter matrix, $\sigma_t, \delta_t, a_t, \beta_t, e_t$ denote a state of a at moment t, a state of δ at moment t, a state of A at moment t, a state of β at moment t, a state of e at moment t respectively, and d denotes a bias item in a neural network.

(2) The probability of a certain transition action $a_t$ at moment t is obtained by using the softmax function, where the obtained probability is described below.

$$p(a_t \mid m_t) = \frac{\exp(g_{a_t}^T m_t + q_{a_t})}{\sum_{a' \in A(S,B)} \exp(g_{a'}^T m_t + q_{a'})}$$

In the formula, $a_t$ denotes the transition action at the moment t, $g_{a_t}$ denotes a column vector of an embedding representation of the transition action $a_t$, $q_{a_t}$ denotes a bias item corresponding to the transition action $a_t$, $m_t$ denotes a state of the model, that is, a coding set of information about all decisions made by the model, at the moment t, A(S, B) denotes an adoptable effective action set when a current state is stored, a' denotes a certain transition action in set A, $g_{a'}$ denotes a column vector of an embedding representation of the transition action a', and T denotes transposition.

The probability of a transition action sequence a is described below.

$$p(a \mid \omega) = \Pi_{t=1}^{|a|} p(a_t \mid m_t)$$

In the formula, |a| denotes the number of transition actions in the transition action sequence a. (3) The (2) is repeated so that probabilities of all transition action sequences are obtained, and then the transition action sequence with the highest probability is used as the optimal transition action corresponding to the transition state at the moment t.

In step 4, according to a series of optimal transition actions obtained during the construction of the entity and relationship joint extraction model based on the transition system of step 3, the series of transition actions is performed on the input statement of step 2 so that the entity set E and the relationship set R corresponding to the input statement are obtained. The entity set E is described below.

$$E = \{(e_i, e_j, r)\}$$

In the formula, $1 \leq i \leq j \leq n$, r denotes a user-defined entity type of a software bug, $e_i$ and $e_j$ denote entities, and r includes core, GUI, Network, I/O, Driver, File System, Hardware, Language, API, Standard, Platform, Framework, Defect test, Mobile, common adjective and common verb.

The relationship set R is described below.

$$R = \{(e_i, e_j, l)\}$$

In the formula, $1 \leq i \leq j \leq n$, l denotes a user-defined attribute tag of a bug relationship, and $e_i$ and $e_j$ denote entities; and l is described in Table 2 below.

TABLE 2

User-defined attribute tag of bug relationship

| Relationship Attribute Name | Relationship Attribute Characteristic | Description |
|---|---|---|
| Sibling relationship | Transitivity and symmetry | Owned class and attribute are derived from a same parent class |
| Identical relationship | Transitivity and symmetry | Having the same meaning and different representations of same knowledge |
| Inclusive relationship | Inclusiveness | Involving content of another entity, such as a concept, nature, etc. |
| Opposite relationship | Antisymmetry | Two should be non-concurrent and mutually exclusive between each other |
| Inheritance relationship | Reciprocal reflexivity | A parent-child relationship and a child-inheriting-parent relationship attribute exist |
| Illustrative relationship | Illustration | Entity A is a description or an operation (an adjective or a verb) of entity B |
| Causal relationship | Dependence | Entity A is a reason for a conclusion of entity B |
| Semantically related | Transitivity and symmetry | A semantic connection exists between the entity A and the entity B |

In step 5, the entity set E and the relationship set R obtained in step 4 are output so that joint extraction of entities and relationships is completed.

The present disclosure will be described below in further detail in conjunction with an embodiment.

Embodiment

Referring to FIG. 1, in the present disclosure, an entity and relationship joint extraction method oriented to software bug knowledge includes the steps described below.

Figures 3, 4:
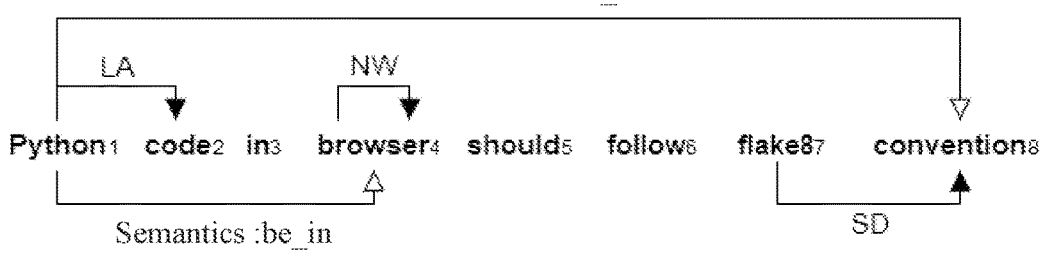
FIG. 3 is a screenshot of a bug report of extracted bug 1368216 according to an embodiment of the present disclosure.
FIG. 4 is an output directed graph of a title of bug 1368216 according to an embodiment of present disclosure.

In step 1, a bug report of an open-source bug library is collected and all text information such as a title, a description and a comment is extracted from the bug report. Then the text data is preprocessed in manners such as statement segmentation, word segmentation and part-of-speech tagging so that a bug corpus is obtained. The bug report of the obtained data source in this embodiment is shown in FIG. 3.

In step 2, a statement S for describing a bug is extracted from the bug text data corpus obtained in step 1. In this embodiment, the first statement S1 obtained from the bug report of FIG. 3 is "Python code in browser should follow flake8 convention.". The result of S1 preprocessed in step 1 is "Python NNP code NN in IN browser NN should MD follow VB flake8 NNP convention NN". This result undergoes word embedding representation and Bi-LSTM layer coding processing and then the processed result serves as the input of a model.

In step 3, an entity and relationship joint extraction model based on a transition system is constructed. The specific transition actions defined in this embodiment are described in Table 1, and the bug relationship types are described in Table 2.

In step 4, in conjunction with the constructed entity and relationship joint extraction model based on the transition system of step 3, for the input statement S1 obtained from the bug corpus in step 2, first the initial transition state $T_0$ of the input statement S1 is determined as $T_0$=([ ], [ ], [ ], [Python code in browser should follow flake8 convention], ∅, ∅). In this case, the buffer stack storing unprocessed words is represented by the formula β=[Python code in browser should follow flake8 convention], and then the words in β are processed in sequence. In this embodiment, the model implementation process is as follows: (1) First, python1 enters from β to e through a Gen-Shift transition action. (2) code2 also enters from β to e through the Gen-shift transition action. (3) An entity tag (python1, code2, LA) is made for an entity block python1 code2 through a Gen-Ner(y) transition action and python1 is repressed into β. (4) The entity python1 is repressed into stack a through a No-Shift transition action. (5) $in_3$ pops out of β through an ODelete action. (6) $browser_4$ enters from β to e through the Gen-Shift. (7) An entity tag ($browser_4$, $browser_4$, NW) is made for $browser_4$ through the Gen-Ner (y) action and $browser_4$ is repressed into β. (8) Through Rightr-Shift, $browser_4$ is pressed into stack σ and a relationship arc (python1, $browser_4$, be_in) from python1 to $browser_4$ is generated. (9) $should_5$ pops out of β through the O-Delete action. (10) $follow_6$ pops out of β through the O-Delete action. (11) $flake8_7$ enters from β to e through the Gen-Shift transition action. (12) $convention_8$ enters from β to e through the Gen-Shift transition action. (13) An entity tag ($flake8_7$, $convention_8$, SD) is made for an entity block $flake8\_convention_8$ through the Gen-Ner(y) transition action and $convention_8$ is repressed into β. (14) Through No-Pass, $browser_4$ is placed at the top of stack δ. (15) Through No-Pass, $python_1$ is placed at the top of stack δ. (16) Finally, through $Right_r$-Pass, $convention_8$ is pressed into stack δ and a relationship arc ($code_2$, $browser_4$, be_in) from $python_1$ to $convention_8$ is generated. Finally, the final transition state is reached so that the entity set E and the relationship set R are obtained. In this embodiment, the specific transition process is described in Table 3.

TABLE 3

Specific transition process

| State | Action Sequence | σ | δ | e | β | R | E |
|---|---|---|---|---|---|---|---|
| 0 | Initial | [ ] | [ ] | [ ] | [$w_1$, $w_2$, ..., $w_8$] | ∅ | ∅ |
| 1 | Gen-Shift | [ ] | [ ] | [$w_1$] | [$w_2$, $w_3$, ..., $w_8$] | ∅ | ∅ |
| 2 | Gen-Shift | [ ] | [ ] | [$w_1$, $w_2$] | [$w_3$, $w_4$ ..., $w_8$] | ∅ | ∅ |
| 3 | Gen-Ner(y) | [ ] | [ ] | [ ] | [$w_1^*$, $w_3$, ..., $w_8$] | ∅ | E ∪ {$w_1$, $w_2$, LA} |
| 4 | No-Shift | [$w_1^*$] | [ ] | [ ] | [$w_3$, $w_4$, ..., $w_8$] | ∅ | — |
| 5 | O-Delete | [$w_1^*$] | [ ] | [ ] | [$w_4$, $w_5$, ..., $w_8$] | — | — |
| 6 | Gen-Shift | [$w_1^*$] | [ ] | [$w_4$] | [$w_5$, $w_6$, $w_7$, $w_8$] | — | — |
| 7 | Gen-Ner(y) | [$w_1^*$] | [ ] | [ ] | [$w_4^*$, $w_5$, ..., $w_8$] | — | E ∪ {$w_4$, $w_4$, NW} |
| 8 | $Right_r$-Shift | [$w_1^*$, $w_4^*$] | [ ] | [ ] | [$w_5$, $w_6$, $w_7$, $w_8$] | R ∪ {$w_1$, $w_4$, be_in} | — |
| 9 | O-Delete | [$w_1^*$, $w_4^*$] | [ ] | [ ] | [$w_7$, $w_8$] | — | — |
| 10 | O-Delete | [$w_1^*$, $w_4^*$] | [ ] | [ ] | [$w_7$, $w_8$] | — | — |
| 11 | Gen-Shift | [$w_1^*$, $w_4^*$] | [ ] | [$w_7$] | [$w_8$] | | |
| 12 | Gen-Shift | [$w_1^*$, $w_4^*$] | [ ] | [$w_7$, $w_8$] | [ ] | | |
| 13 | Gen-Ner(y) | [$w_1^*$, $w_4^*$] | [ ] | [ ] | [$w_8^*$] | | E ∪ {$w_7$, $w_8$, SD} |
| 14 | No-Pass | [$w_1^*$] | [$w_4^*$] | [ ] | [$w_8^*$] | | |
| 15 | No-Pass | [ ] | [$w_4^*$, $w_1^*$] | [ ] | [$w_8^*$] | | |
| 16 | $Right_r$-Pass | [ ] | [$w_4^*$, $w_1^*$] | [ ] | [$w_8^*$] | R ∪ {$w_1$, $w_8$, should_follow} | |
| 17 | Final State | [$w_1^*$, $w_4^*$, $w_8^*$] | [ ] | [ ] | [ ] | R | E |

In step 5, the entity set E and the relationship set R obtained in step 4 are output so that joint extraction of entities and relationships is completed. In this embodiment, the directed graph of the specific output result is shown in FIG. 4, the specific output result includes 3 entities and 2 relationships. A solid arrow in the figure indicates the relationship in an entity so that the type of the entity is described. For example, python is the Language-class entity that has previously been classified. A hollow arrow in the figure indicates the relationship between an entity and another entity. For example, the relationship between Python_code and browser is a semantic relationship, and the extracted predicate is be_in. Finally, the entity set E and the relationship set R of this bug are recognized. E={(Python, code, LA), (browser, browser, NW), (flake8, convention, SD)} and R={(Python_code, browser, be_in), (Python_code, flake8_convention, should follow)}.

The method of the present disclosure is centered on the predefined bug relationship type. Through semantics, transition-based dependence analysis strategy and Bi-LSTM neural network method, joint modeling is performed on the relationship triple formed by the bug entity relationships. In this method, two subtasks of bug entity extraction and relationship recognition are closely linked, and the key information of a bug text is extracted. In this manner, a software developer can quickly and efficiently understand bug information and complete bug fixing.

What is claimed is:

1. An entity and relationship joint extraction method oriented to software bug knowledge, comprising:

step 1: collecting text data of an open-source bug library and preprocessing the text data to obtain a bug text data corpus;

step 2: extracting, from the bug text data corpus obtained in step 1, a statement S for describing a bug, processing S, and then using the processed S as an input statement;

step 3: constructing an entity and relationship joint extraction model based on a transition system, comprising:

step 3-1: determining an initial transition state $T_0$ of the entity and relationship joint extraction model based on the transition system;

step 3-2: determining an optimal transition action corresponding to the initial transition state $T_0$ of step 3-1 and performing the optimal transition action on the initial transition state $T_0$ to obtain a transition state at a next moment; and, step 3-3: determining an optimal transition action corresponding to the transition state at the next moment, performing the optimal transition action on the transition state at the next moment, and looping in such manner until a final transition state $T_n$ is reached, so as to complete the construction of the entity and relationship joint extraction model based on the transition system;

wherein the transition state is represented by an LSTM-based method by using the following formula:

$$T=(\sigma,\delta,e,\beta,R,E),$$

where σ denotes a stack storing a generated entity, δ denotes a transition stack storing an entity temporarily popping out of σ and then repressed into σ, e denotes a stack storing part of entity blocks being processed, β denotes a buffer storing unprocessed words, R denotes a relationship set, and E denotes an entity set;

wherein the initial transition state $T_0$ is a transition state in which β is not empty and σ, δ, e, R and E are empty, wherein $T_0$ is represented by:

$$T_0=([\ ],[\ ],[\ ],[w_1,w_2,w_3,\ldots,w_m], \emptyset, \emptyset),$$

where m denotes a number of the unprocessed words; and wherein the final transition state $T_n$ is a transition state in which β and e are empty, wherein $T_n$ is represented by:

$$T_n=(\sigma,\delta,[\ ],[\ ], R, E);$$

step 4: obtaining, in conjunction with the constructed entity and relationship joint extraction model based on the transition system in step 3, an entity set E and a relationship set R corresponding to the input statement of step 2; and, step 5: outputting the entity set E and the relationship set R obtained in step 4 to complete joint extraction of entities and relationships.

2. The entity and relationship joint extraction method oriented to software bug knowledge of claim 1, wherein the text data of step 1 comprises a title, a description and a comment in a bug report, and a question and an answer in a question and answer website.

3. The entity and relationship joint extraction method oriented to software bug knowledge of claim 1, wherein in step 1, preprocessing the text data to obtain the bug text data corpus comprises:

preprocessing the text data by using a natural language processing tool, and storing the preprocessed related text data in a form of text to obtain the bug text data corpus, wherein the preprocessing comprises text extraction, word segmentation, part-of-speech tagging and lemmatization.

4. The entity and relationship joint extraction method oriented to software bug knowledge of claim 1, wherein in step 2, the statement S for describing the bug is:

$$S=\{w_1,w_2,w_3,\ldots,w_n\}$$

where $w_i$ denotes an i-th word in a statement sequence S, and i=1, 2, . . . , n.

5. The entity and relationship joint extraction method oriented to software bug knowledge of claim 1, wherein in step 2, processing S comprises:

step 2-1: performing word embedding processing on S; and, step 2-2: performing Bi-directional Long Short-Term Memory (Bi-LSTM) coding processing on S processed in step 2-1.

6. The entity and relationship joint extraction method oriented to software bug knowledge of claim 1, wherein in step 3-1 to step 3-3, the transition action comprises:

generating a directed graph by using a transition strategy formed by an arc-eager algorithm, wherein according to characteristics of the directed graph, the transition strategy comprises two types of transition actions:

(1) an entity generation action, which is used for generating an entity arc; and, (2) a relationship generation action, which is used for generating a relationship arc.

7. The entity and relationship joint extraction method oriented to software bug knowledge of claim 1, wherein in step 3-2 to step 3-3, determining the optimal transition action corresponding to the transition state comprises: determining, in conjunction with a softmax function and an arc-standard algorithm based on greedy search, the optimal transition action corresponding to the transition state, which comprises:

(1) assuming that a transition state of the entity and relationship joint extraction model based on the transition system at moment t is:

$$m_t=\max\{0,Z\}$$

where $Z=W[\sigma_t;\delta_t;a_t;\beta_t;e_t]+d$, W denotes a parameter matrix, $\sigma_t, \delta_t, a_t, \beta_t, e_t$ denote a state of σ at the moment t, a state of δ at the moment t, a state of A at the moment t, a state of β at the moment t, a state of e at the moment t respectively, and d denotes a bias item in a neural network;

(2) obtaining a probability of a certain transition action $a_t$ at the moment t by using the softmax function, wherein the obtained probability is:

$$p(a_t|m_t) = \frac{\exp(g_{a_t}^T m_t + q_{a_t})}{\sum_{a' \in A(S,B)} \exp(g_{a'}^T m_t + q_{a'})},$$

where $a_t$ denotes the transition action at the moment t, $g_{a_t}$ denotes a column vector of an embedding representation of the transition action $a_t$, $q_{a_t}$ denotes a bias item corresponding to the transition action $a_t$, $m_t$ denotes a state of the model, that is, a coding set of information about all decisions made by the model, at the moment t, A(S, B) denotes an adoptable effective action set when a current state is stored, a' denotes a certain transition action in set A, $g_{a'}$ denotes a column vector of an embedding representation of the transition action a', and T denotes transposition, and, wherein a probability of a transition action sequence a is:

$$p(a|\omega) = \Pi_{t=1}^{|a|} p(a_t|m_t)$$

where |a| denotes a number of transition actions in the transition action sequence a; and, (3) repeating (2) to obtain probabilities of all transition action sequences, and then using a transition action sequence with a highest probability as an optimal transition action corresponding to the transition state at the moment t.

8. The entity and relationship joint extraction method oriented to software bug knowledge of claim 1, wherein in step 4, obtaining, in conjunction with the constructed entity and relationship joint extraction model based on the transition system in step 3, the entity set E and the relationship set R corresponding to the input statement of step 2 comprises:

performing, according to a series of optimal transition actions obtained during the construction of the entity and relationship joint extraction model based on the transition system of step 3, a series of transition actions on the input statement of step 2 to obtain the entity set E and the relationship set R corresponding to the input statement.

9. The entity and relationship joint extraction method oriented to software bug knowledge of claim 4, wherein the entity set E obtained in step 4 is:

$$E=\{(e_i,e_j,r)\}$$

where $1 \le i \le j \le n$, r denotes a user-defined entity type of a software bug, $e_i$ and $e_j$ denote entities, and r comprises core, GUI, Network, I/O, Driver, File System, Hardware, Language, API, Standard, Platform, Framework, Defect test, Mobile, common adjective and common verb; and, wherein the relationship set R is:

$$R=\{(e_i,e_j,l)\}$$

where $1 \le i \le j \le n$, l denotes a user-defined attribute tag of a bug relationship, and $e_i$ and $e_j$ denote entities; and l is described in a Table 2 as follows:

TABLE 2

The user-defined attribute tag of the bug relationship

| Relationship Attribute Name | Relationship Attribute Characteristic | Description |
|---|---|---|
| Sibling relationship | Transitivity and symmetry | Owned class and attribute are derived from a same parent class |
| Identical relationship | Transitivity and symmetry | Having a same meaning and different representations of same knowledge |
| Inclusive relationship | Inclusiveness | Involving content of another entity, such as a concept, nature, etc. |
| Opposite relationship | Antisymmetry | Two should be non-concurrent and mutually exclusive between each other |
| Inheritance relationship | Reciprocal reflexivity | A parent-child relationship and a child-inheriting-parent relationship attribute exist |
| Illustrative relationship | Illustration | Entity A is a description or an operation (an adjective or a verb) of entity B |
| Causal relationship | Dependence | Entity A is a reason for a conclusion of entity B |
| Semantically related | Transitivity and symmetry | A semantic connection exists between the entity A and the entity B. |

10. The entity and relationship joint extraction method oriented to software bug knowledge of claim 8, wherein the entity set E obtained in step 4 is:

$$E=\{(e_i,e_j,r)\}$$

where $1 \le i \le j \le n$, r denotes a user-defined entity type of a software bug, $e_i$ and $e_j$ denote entities, and r comprises core, GUI, Network, I/O, Driver, File System, Hardware, Language, API, Standard, Platform, Framework, Defect test, Mobile, common adjective and common verb; and, wherein the relationship set R is:

$$R=\{(e_i,e_j,l)\}$$

where $1 \le i \le j \le n$, l denotes a user-defined attribute tag of a bug relationship, and $e_i$ and $e_j$ denote entities; and l is described in a Table 2 as follows:

TABLE 2

The user-defined attribute tag of the bug relationship

| Relationship Attribute Name | Relationship Attribute Characteristic | Description |
|---|---|---|
| Sibling relationship | Transitivity and symmetry | Owned class and attribute are derived from a same parent class |
| Identical relationship | Transitivity and symmetry | Having a same meaning and different representations of same knowledge. |

* * * * *